United States Patent [19]

Montet et al.

[11] Patent Number: 4,670,199
[45] Date of Patent: Jun. 2, 1987

[54] METHOD OF PRODUCING A REFLECTOR FOR A HEADLIGHT, PARTICULARLY FOR AN AUTOMOBILE, BY TWO-MATERIAL INJECTION MOLDING

[75] Inventors: Maurice Montet, Bagnolet; Antoine Baciu, Anbevoye, both of France

[73] Assignee: Cibie Projecteurs, France

[21] Appl. No.: 842,316

[22] Filed: Mar. 21, 1986

[30] Foreign Application Priority Data

Mar. 25, 1985 [FR] France ................................ 85 04390

[51] Int. Cl.⁴ .......................................... B29D 11/00
[52] U.S. Cl. .................................... 264/1.9; 264/45.1; 264/129; 264/255; 264/327; 264/328.8; 264/328.12; 425/130; 425/146; 425/812
[58] Field of Search ...................... 264/1.7, 1.9, 45.1, 264/46.4, 46.6, 259, 275, 255, 278, 328.8, 327, 328.12, 129; 425/130, 146, 812

[56] References Cited

U.S. PATENT DOCUMENTS

| | | | |
|---|---|---|---|
| 3,917,789 | 11/1975 | Heisler | 264/255 X |
| 4,014,966 | 3/1977 | Hanning | 264/328.12 X |
| 4,017,225 | 4/1977 | Hanning | 425/130 X |
| 4,035,466 | 7/1977 | Langecker | 264/45.1 X |
| 4,201,742 | 5/1980 | Hendry | 425/812 X |
| 4,335,068 | 6/1982 | Hemery | 264/328.8 X |
| 4,419,321 | 12/1983 | Hardigg | 264/328.12 |
| 4,459,257 | 7/1984 | Baciu | 264/255 |
| 4,474,717 | 10/1984 | Hendry | 425/812 X |
| 4,507,254 | 3/1985 | Daniels et al. | 264/1.9 |
| 4,560,342 | 12/1985 | Ishida et al. | 264/328.12 X |

FOREIGN PATENT DOCUMENTS

| | | | |
|---|---|---|---|
| 2320098 | 11/1973 | Fed. Rep. of Germany . | |
| 2079295 | 11/1971 | France . | |
| 2142067 | 1/1973 | France . | |
| 0073456 | 6/1980 | Japan | 264/275 |
| 1313748 | 9/1969 | United Kingdom | 264/278 |
| 2025838 | 1/1980 | United Kingdom . | |

Primary Examiner—Jan H. Silbaugh
Assistant Examiner—Harold Pyon

[57] ABSTRACT

Method of production of a reflector wall having a core of thermosetting material enclosed in a skin of thermoplastic material, by two-material injection molding. Between a concave mold face having projecting points and a convex mold face, a thermoplastic skin material and a thermosetting core material having a polycondensation temperature greater than the plasto-elasticity temperature of the thermoplastic skin material are successively injected, while holding a temperature intermediate between the two temperatures; the points cause in the skin material interruptions permitting the emergence of the core material to the concave mold face, in localised zones of this in which open vents; the polycondensation of the core material and the hardening of the skin material is successively caused.

11 Claims, 11 Drawing Figures

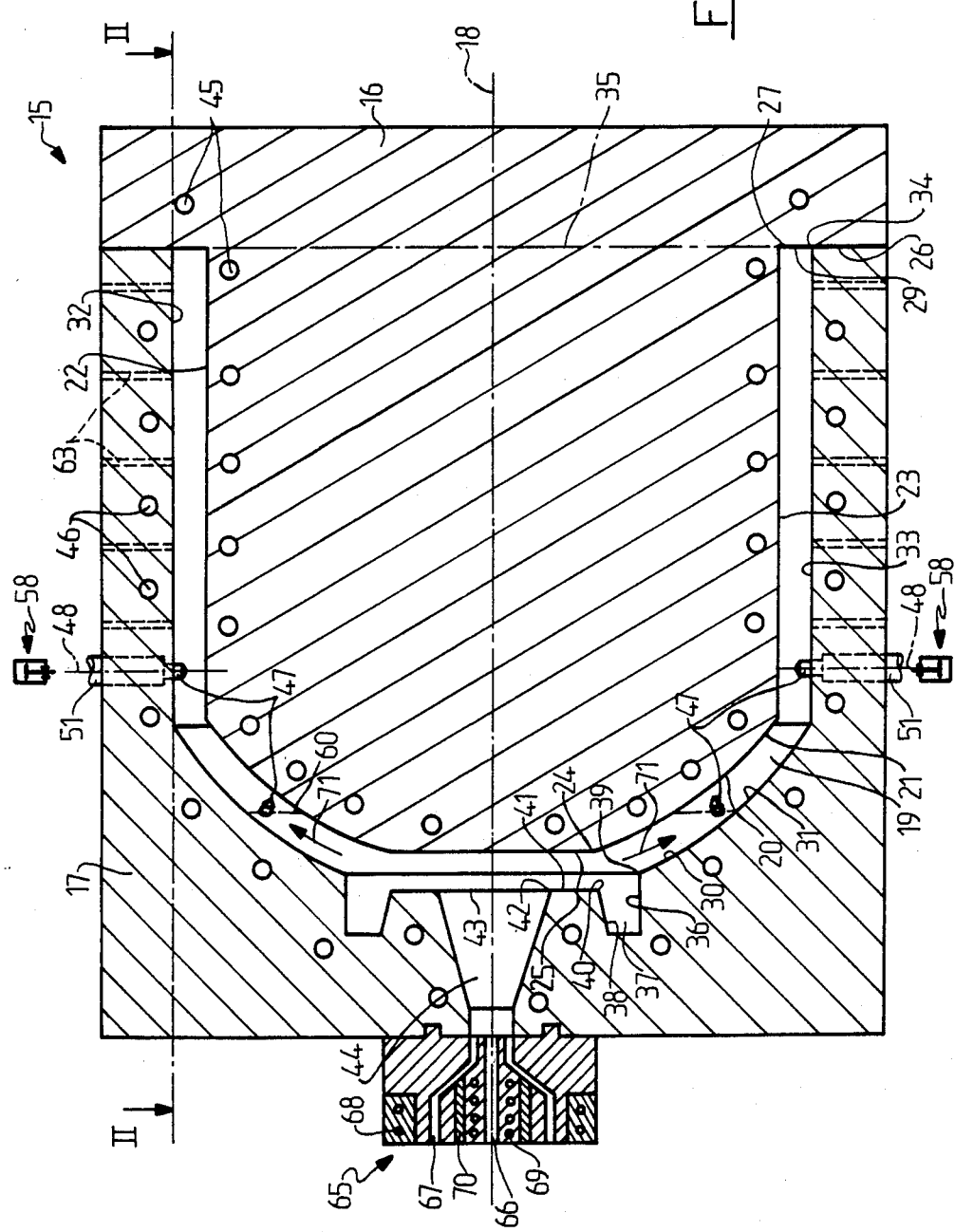

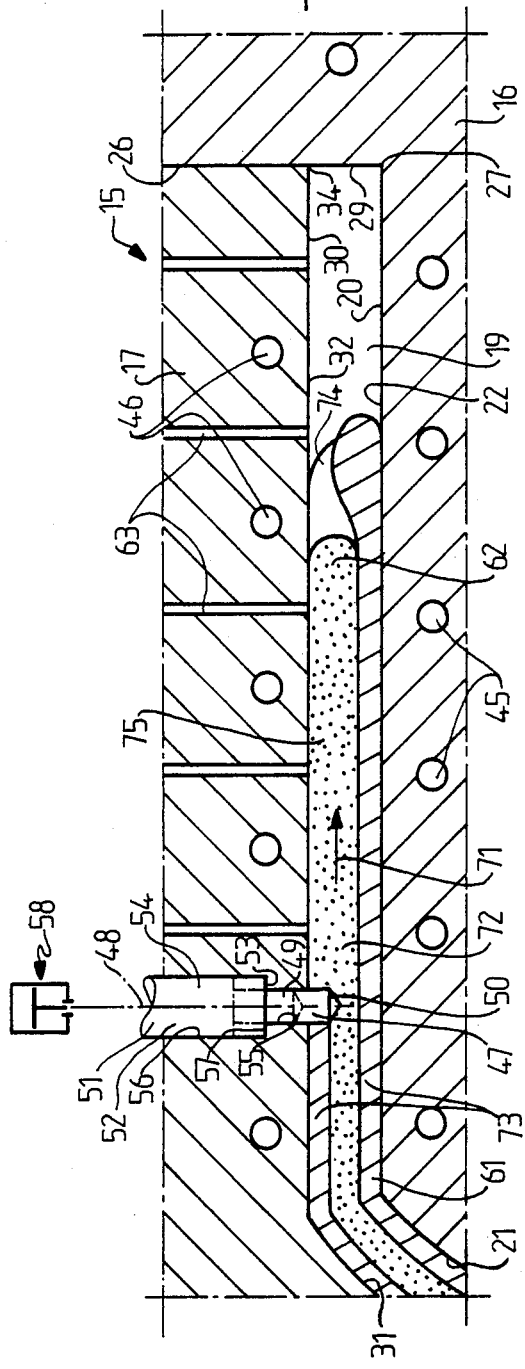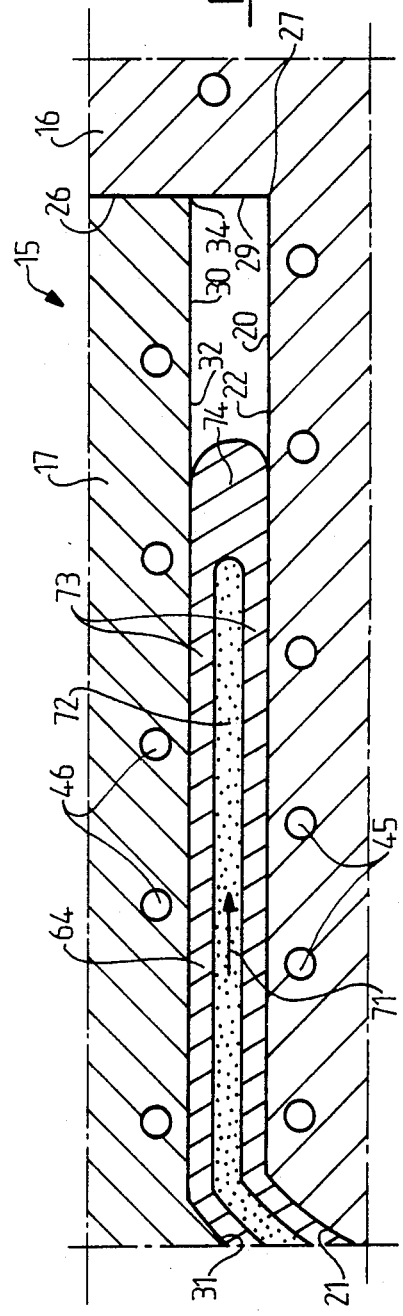

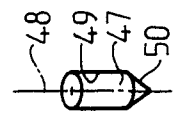
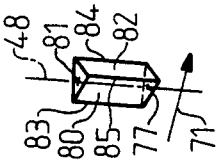
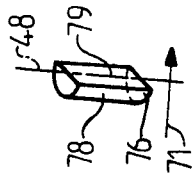
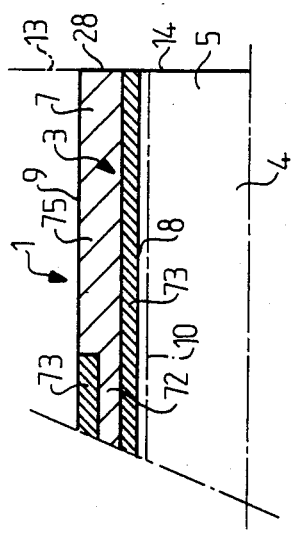
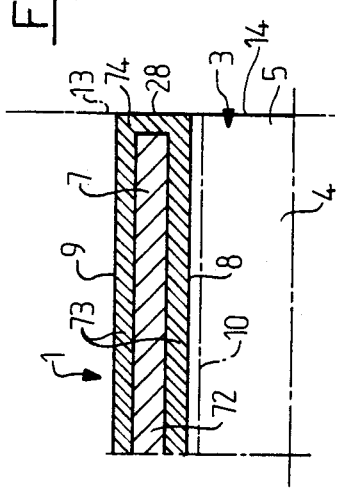
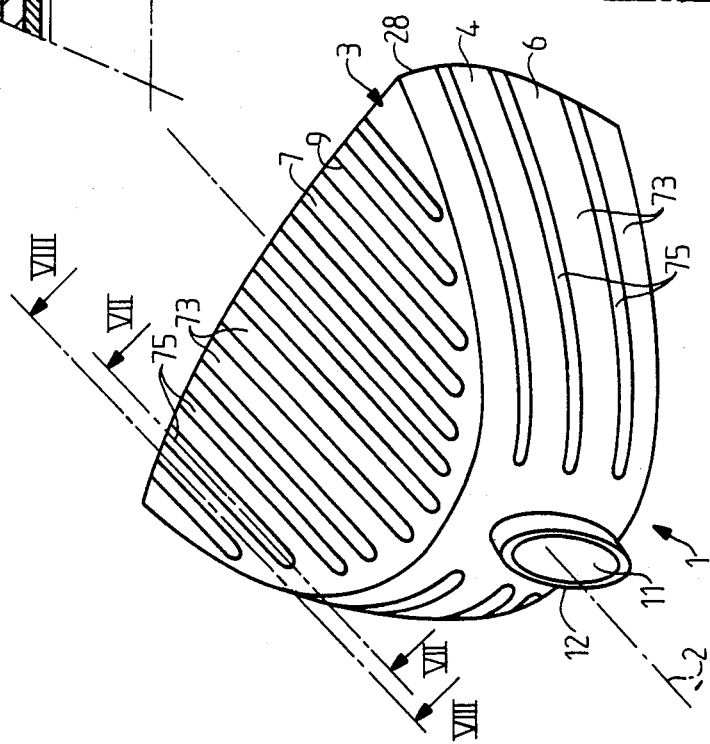

METHOD OF PRODUCING A REFLECTOR FOR A HEADLIGHT, PARTICULARLY FOR AN AUTOMOBILE, BY TWO-MATERIAL INJECTION MOLDING

SUMMARY OF THE INVENTION

The present invention relates to production of a reflector for a headlight, particularly for an automobile, by a process comprising the manufacture, by injection molding, of a wall having a core layer, of predetermined volume, intended to give the reflector its characteristics of mechanical strength and a skin layer, of predetermined volume, enclosing the core layer on both sides, whilst defining particularly a smooth concave face, intended to form a reflective face of the reflector.

In French patent application No. 82 11748, published under No. 2 529 507, the present applicant has described production of such a wall by a process comprising the succession of stages consisting in:

(a) delimiting a mold for the wall, of a volume substantially corresponding to the sum of the respective volumes of the core layer and of the skin layer, by means of a convex mold face having a shape complementary to that of the concave face of the wall to be produced, and of a concave mold face placed opposite the convex mold face and spaced from this latter, whilst arranging an injection aperture opening into the mold;

(b) injecting into the mold, via the injection aperture, a volume of thermoplastic skin material corresponding substantially to the volume of the skin layer of the wall to be produced, this thermoplastic material having a predetermined plasto-elasticity temperature and being injected at a temperature greater than this plasto-elasticity temperature; the thermoplastic skin material thus injected remains collected together in the immediate proximity of the injection aperture, in the mold, in so far as it delimits a volume corresponding to the total volume of the layers of the wall to be produced;

(c) injecting into the mold and into the thermoplastic skin material collected in the immediate proximity of the injection aperture, via this latter, a volume of core material in fluid state corresponding substantially to the volume of the core layer of the wall to be produced, whilst maintaining the thermoplastic skin material at a temperature greater than its plasto-elasticity temperature such that the core material in fluid state causes the thermoplastic skin material to progressively migrate against the convex and concave faces of the mold, in the direction of extension with respect to the injection aperture, and that the thermoplastic skin material is sandwiched in the mold between on the one hand the core material and on the other hand the convex and concave mold faces;

(d) permitting or causing a hardening of the thermoplastic skin material, at least, to obtain a rigid wall inside the mold;

(e) disengaging the mold from the rigid wall thus obtained.

This technique, known under the name of "two-material injection" is widely used when producing products of which the core layer is produced, as a skin layer, of thermoplastic material; in the mentioned patent application, the present applicant combines this injection technique and a particular choice of thermoplastic core material, that is to say polyethylene terephtalate, and proposes to use a skin layer as a thermal barrier isolating any part of the core layer with respect to the comparatively cold mold, for slowing down the cooling of the core layer and giving it a semi-crystalline structure which is particularly advantageous mechanically.

It appears that one can also advantageously use, as the core material, a thermosetting material judiciously chosen and suitably loaded which is more economic and better resists the inherent thermal loading from use of the wall as a headlight reflector, whilst enclosing this core layer in a skin layer itself produced in thermoplastic material in a conventional manner, for giving to the wall a surface state compatible with its use as a reflector.

However, it is also apparent that it is then expedient to abandon the two-material injection method, of which the operating conditions appear to be incompatible with the coexistence in the same mold, of a thermoplastic skin material and of a thermosetting core material; in effect, if one considers the stage c of injection of the core material now presupposed to be thermosetting, and the associated migration of it and the thermoplastic skin material, one notes the importance of bringing the thermoplastic skin material to a temperature sufficiently high for it to remain fluid as opposed to the importance of holding the thermosetting core material at a sufficiently low temperature for it also to remain fluid; as concerns stage d, there will be observed the necessity of heating the thermosetting core material for causing its hardening at the same time as the thermoplastic skin material must on the contrary be cooled for this effect, which necessity necessitates that in a first period the polycondensation of the thermosetting material is caused by heating of it, then in a second period the hardening of the thermoplastic skin material is caused by cooling of this, whilst maintaining during these two successive phases the product being produced inside the mold in order to hold the thermoplastic skin material in the required shape; this poses the problem of evacuating from the mold, across the thermoplastic skin material resulting gases and vapours, as is known to the man skilled in the art, of the polycondensation of the thermosetting material; in fact, the thermosetting materials lose in the region of 5 to 7% of their weight by evaporation (gas, vapour) during their polycondensation, and up to now it has been considered that such removal, inside the thermoplastic layer still in fluid state during the polycondensation of the thermosetting core material, would constitute an insurmountable obstacle to the mechanical or chemical connection between the two materials, and would lead to the formation of bubbles in the thermoplastic skin material, giving it a surface appearance particularly incompatible with the definition of a smooth concave face intended to form a reflective face of a reflector.

THE INVENTION

The object of the present invention is to remove these incompatibilities, for proposing a method of two-material injection applicable to production of a product having a core layer of thermosetting material and a skin layer of thermoplastic material.

For this, the method of the present invention, retaining stages a, b, c, d, e such as have been described above, is characterised by:

during stage a, placing projecting with respect to the concave mold face, inside the mold, a plurality of points spaced from the injection aperture, mutually spaced and opposite the convex mold face, for preventing the migration of the thermoplastic skin material, during stage c, against localised zones of the concave mold face, situated opposite from the injection aperture with respect to the different points respectively, and then permitting access of the core material to the said localised zones of the concave mold face, during stage c, injecting by way of core material a thermosetting material having a polycondensation temperature greater than the plasto-elasticity temperature of the thermoplastic skin material, whilst holding the mold at a temperature intermediate between the set temperatures respectively of polycondensation and of plasto-elasticity and withdrawing the said points with respect to the concave mold face at an intermediate stage of the injection of the thermosetting core material, preliminarily to stage d, arranging vents opening into the mold via the said localised zones of the concave mold face, during stage d, causing a heating of the mold to a temperature greater than the polycondensation temperature of the thermosetting core material then permitting or causing a cooling of the mold to a temperature lower than the plastoelasticity temperature of the thermoplastic skin material.

Thus, preservation of the fluidity of the thermosetting core material is ensured as well as that of the thermoplastic skin material, that is to say, particularly their ability to jointly migrate in the mold until they fill this latter, without risk of blocking of this migration; during this latter, the presence of the points provide an obstacle to the migration of the thermoplastic skin material against the concave mold face results in the creation, in the thermoplastic core material in the course of migration, of interruptions immediately filled by the thermosetting core material which thus forms in the thermoplastic skin material ribs in direct contact with the concave mold face, even though the thermoplastic skin material migrates without interruption against the convex mold face; when the polycondensation of the thermosetting core material is caused, the gases and vapours produced by this polycondensation can cross without disturbing it, the layer of thermoplastic skin material via the ribs, to reach the vents opening in the mold precisely opposite these ribs; thus, any migration of gases and vapours from polycondensation towards the convex mold face is avoided, which forms in the skin layer a smooth concave face.

If, according to a preferred embodiment of the method of the invention, the convex mold face has a mirror finish, it does communicate this mirror finish to the concave face of the product obtained, and one can proceed to a direct deposit of a reflective metallic layer on this face, without the traditional stages of deburring, cleaning and varnishing, which permits considerable simplifying of the manufacture of the reflector and of producing a substantial economy in the sale price.

Advantageously, the anchoring of the reflecting metallic layer is facilitated by the incorporation of mineral microloadings, for example titanium oxide, barium, sulphate, or other pigments, into the thermoplastic skin layer.

Preferably, the concave mold face is crackle finished which adds to the action of the points in effect of slowing the thermoplastic skin material and facilities the substitution of it by the thermosetting core material in the form of ribs in direct contact with the concave mold face.

It will be noted that the wall obtained has ribs of thermosetting core material emerging in the thermoplastic skin material as well as, possibly, a crackled surface state resulting from this finish of the concave mold face, this emergence and this surface state are restricted to a convex face formed by the concave mold face and present no inconvenience when only the concave face of the wall is intended to constitute a reflective face of the reflector; the ribs prove to be advantageous, on the contrary, because they constitute in themselves a reinforcement of the reflector and permit reduction of the thickness which incorporates in addition the core layer, with the result of an overall lightening of the reflector and an economy of thermosetting core material.

Other characteristics and advantages of the invention will appear from the following description, in connection with a non-limitative embodiment of the method as well as from the accompanying drawings which form an integral part of this description.

THE DRAWINGS

FIG. 1 shows a cross-sectional view of a mold intended for the method according to the invention, on a section plane including an axis defining an optical axis of the reflector produced by means of the wall manufactured in this mold.

FIGS. 4 and 5 show partial cross-sectional views respectively on planes IV—IV and V—V in FIG. 3.

FIG. 6 shows in a perspective view the wall obtained by operating the method in the mold shown in FIG. 1.

FIGS. 7 and 8 show partial cross-sectional views of this wall on planes VII—VII and VIII—VIII respectively in FIG. 6.

FIGS. 9 to 11 show, in perspective views, different shapes of points usable for causing in the thermoplastic core material during migration interruptions for the emergence of the thermosetting core material.

PREFERRED EMBODIMENT

Figure 3:
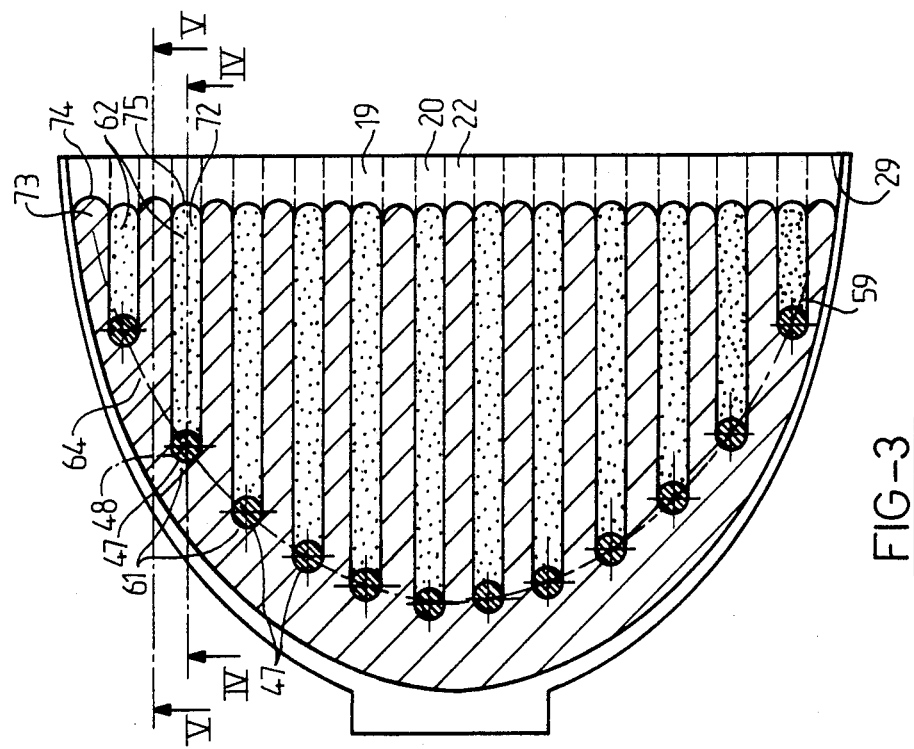
FIG. 2 and 3 illustrate two successive stages of the migration of the skin and core materials in the mold, in cross section on the plane II–II in FIG. 1, the mold as such not being shown.

In these figures, there is shown by way of non-limitative example the manufacture of a reflector 1 having a general shape known in itself, and more particularly visible in FIGS. 6 to 8; in this example, the reflector 1 has an optical axis 2 and is delimited by a wall 3 which is symmetric with respect to the axis 2 and comprises:

a zone 4 delimited by faces 5 and 6 parallel between themselves and respectively concave and convex, taking up respective paraboidal shapes centred on the axis 2, two zones such as 7 of which each is delimited by a plane face such as 8, facing the axis 2 to which it is parallel and by a plane face such as 9 parallel to the face such as 8 and to the axis 2, facing in a direction of radial extension with respect to this latter.

The concave face 5 of the zone 4 of the wall 3 and the faces such as 8, facing the axis 2, of zones such as 7 of this wall define together a smooth concave face intended to form a reflective face of the reflector 1 after covering by a reflective metallic layer 10, for example of aluminium; the convex face 6 of the zone 4 and the faces such as 9, facing outwards, of the two zones such as 7 of the wall 3 have on the other hand no optical role at all.

About the axis 2, the zone 4 of the wall 3 is pierced from side to side by a mounting aperture 9 for a lamp, which has a circular shape about the axis 2; around the aperture 11, the face 6 of the zone 4 of the wall 3 has an annular edge 12, centered on the axis 2, intended to receive means for mounting the lamp.

Opposite the aperture 11 in the direction of the axis 2, the wall 3 has an edge 28 in a plane 13 perpendicular to the axis 2, which defines for the reflector an open face 14 intended for the emission of light.

Naturally this shape constitutes only a non-limitative example, and the man skilled in the art will easily understand that other shapes of reflector can be made by the method according to the invention, without departing from the scope of it.

According to the invention, the different zones of the wall 3, the annular edge 12 as well as a disc temporarily closing the aperture 11 are produced in a single block by two-material injection moulding, in a mold of which an embodiment is shown in FIG. 1 as well as, partially, in FIGS. 4 and 5.

In a conventional manner, the illustrated mold 15 has a die 16 and a matrix 17 able to be assembled in a rigorously defined relative position, in which they have a common axis 18 defining between them a mold 19 of a rigorously complementary shape of which of the wall 3 including the non-shown disc temporarily closing the aperture 11 and the edge 12 as shown in FIG. 1, or on the contrary able to be separated by opening of the mold 19.

More precisely, the die 16 delimits the mold 19 by a convex mold face 20 having a zone 21 rigorously complementary to the face 5, that is to say paraboloidal shape centred on the axis 18, and two zones 22,23 rigorously respectively complementary with each other of faces such as 8, that is to say plane and parallel to each other and to the axis 18 of which it will be noted that it defines for the mold 19 an axis of symmetry as well as the axis 2 defining the axis of symmetry for the wall 3; in the direction of radial approach with respect to the axis 18, the zone 21 of the convex mold face 20 is connected, by a circular sharp corner 24, at a zone 25 in the form of a flat disc perpendicular to the axis 18, this zone 25 being intended to form the disc temporarily closing the aperture 11; in the direction of a radial extension with respect to the axis 18, the zone 21 of the convex mold face 22 is connected on the one hand to zones 22 and 23 and on the other hand to a flat face 26 perpendicular to the axis 18 and also bordering the zones 22 and 23 of the face 20 whilst having, along the length of a sharp continuous corner 27 connecting the different zones 21,22,23, a zone 29 tightly complementary to the edge 28 of the reflector 1 to be produced.

At least the zones 21,22,23 of the convex mold face 20 have advantageously a mirror finish.

The matrix 17 itself delimits the mold 19 by a concave mold face 30 having a zone 31 in paraboloidal shape centered on the axis 18, tightly complementary with the face 6, and two flat zones, parallel to each other and the axis 18, respectively 32 and 33, rigorously complementary to the faces such as 9; in the direction of radial extension with respect to the axis 18, the zone 31 is delimited on the one hand by the junction with zones 32 and 33 on the other hand by an interruption, just as the zones 22 and 23 following a virtual plane 35 perpendicular to the axis 18 and common to the face 26 of the die 16, along the length of a sharp junction corner with this face 26; in the direction of radial approach with respect to the axis 18, the zone 31 of the concave mold face 30 is connected by a circular sharp corner 39, centred on the axis 18, to a flank 36 of a groove 37 circular about the axis 18, which groove has in addition a flank 38, situated closer to the axis 18 than its flank 36 and connecting, along the length of a sharp corner 40 also circular about the axis 18, to a flat annular face 18 itself connecting, by a sharp corner 42 circular about the axis 18, situated closer to this axis 18 than the sharp corner 40, to an aperture 43 by which an injection channel 44 on the axis 18 opens into the mold 31; it will be noted that the zones 31,32,33 of the concave mold face 30 are spaced from the zones 21,22,23 of the concave mold face 20 throughout their extent, just as the face 41 is spaced from the zone 25 of the convex mold face 20, so that the mold 19 integrally communicates with the injection aperture 43.

The structure of the die 16 and of the matrix 17 which has been described is traditional and the man skilled in the art will know what geometry to give to the mold 16 and the matrix 17 as a function of any desired shape of reflector 1 to be produced; he will also know to provide means for rigorous relative positioning of the die 16 and of the matrix 17, just as he will know to provide the die 16 and the matrix 17 with means for forced heating and cooling of the mold 31, shown diagrammatically in FIGS. 1,4 and 5 by channels 45 for circulation of fluid in the die 16 in the immediate region of the different zones of the convex mold face 20, and by channels 46 for circulation of such a fluid in the matrix 17, along the length of the concave mold face 30, of the groove 37 and of the injection channel 44.

The mold shown in FIG. 1 is distinguished from molds normally used in injection molding, particularly for two thermoplastic materials, by a crackled surface state of the concave mold face 30 at least in its zone 31,32,33, and by the presence of points such as 47 able to project inside the mold 19, with respect to these three zones 31,32,33 of the concave mold face 30, or on the contrary, to be withdrawn into the matrix 17 with respect to these zones 31,32,33.

One of these points, corresponding to the zone 32 of the concave mold face 30, is more particularly visible in FIG. 4 where it is illustrated in full lines in its position projecting inside the mold 19, and in broken lines in its withdrawn position inside the matrix 17, it being intended that the description of this point is applied equally to analogous points placed in the zones 31 and 33 of the concave mold face 30.

The point 47 visible in FIG. 4, also shown in FIG. 9, has a generally circular shape about the axis 48 perpendicular to the zone 32 to which it corresponds; in the direction of a radial extension with respect to the axis 48, this point 47 is delimited by a surface 49, circularly cylindrical about the axis 48, whereas, transversely with respect to this axis, it is delimited towards the mold 19 by an end face 50, circularly conical about the axis 48 and converging towards the associated zone 22 of the convex mold face 20; opposite its end face 50 on the axis 48, the point 47 is connected in a rigid manner to a rod 51 delimited by a surface 52 circularly cylindrical about the axis 48 with a diameter greater than that of the surface 49 of the point 47, so that the surface 49 of this latter is connected to the surface 52 by the rod 51 via an annular shoulder 53 circular about the axis 48.

For receiving the point 47 and the rod 51, and slidingly guiding them on the axis 48, the matrix is pierced by a bore 54 opening into the zone 32 of the concave mold face 30, nearer to the junction of the zone 32 with the zone 31 than the sharp corner 34; at its junction with the zone 32, the bore 54 is delimited by a surface 55 circularly cylindrical about the axis 48 with a diameter substantially identical to that of the surface 49 of the point 47 in a manner to establish a sliding contact, although it is delimited in addition by a surface 56 also circularly cylindrical about the axis 48 with a diameter substantially identical to that of the surface 52 of the rod 51 for also establishing a sliding contact; the surfaces 55 and 56 are connected by an annular shoulder 57 circular about the axis 48, which annular shoulder serves as an abutment for the annular shoulder 53 and thus limits the sliding of the assembly rod 51/point 47, towards the inside of the mold 19; the distance separating the shoulder 57 of the zone 30 from the face 30, parallel to the axis 48, is less than the dimension which the surface 49 of the point 47 has parallel to the axis 48 so that the mutual abutment of the shoulders 53 and 57 corresponds to a projection of the point 47 inside the mold 19, with respect to the zone 32 of the face 30; nevertheless, the point 47 has an overall dimension, parallel to the axis 48, from the shoulder 53 to the face 50, less than the distance separating the shoulder 57 from the zone 22 of the face 20 associated with the zone 32 of the face 30 so that, when the shoulders 53 and 57 are in mutual abutment, the end face 50 of the point 47 remains spaced from the zone 22 of the face 20 as illustrated in FIG. 4; with respect to such a position, a joint sliding of the rod 51 and of the point 47 inside the bore 54 parallel to the axis 48 in a manner to mutually space the shoulders 53 to 57 permits total withdrawal of the point 47 with respect to the zone 32 of the face 30.

The sliding of the rod 51 and of the point 47 in the matrix 17 can be caused at will by any appropriate means, and for example by hydraulic means shown diagrammatically at 58, advantageously common to several points 47 so that their movement of withdrawal or projection inside the mold 19 is simultaneous.

Figure 2:
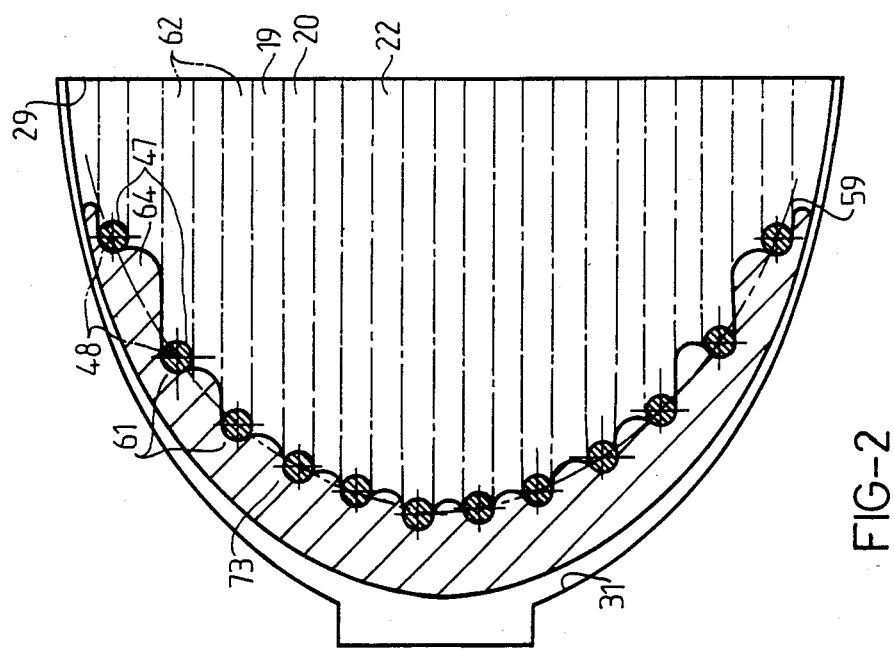

Several points 47 are thus provided in the zone 32, in which they are spaced along the length of a virtual curve 59 following the junction of the zone 32 with the zone 31, and being spaced two by two along the length of this curve 59 as will be seen from examining FIGS. 2 and 3; the points are arranged in an analogous manner in the zone 33, in which they are spaced along the length of a virtual curve following the junction of this zone with the zone 31; these points, slidingly mounted in the matrix 17 in the previously described manner, can be driven, by action on the means 58, into a position withdrawn with respect to the zone 33, or into a position in which they project with respect to this face 33, whilst remaining nevertheless spaced with respect to the corresponding zone 32 of the convex mold face 20; in the zone 31, the points 47 are mounted slidingly in the same manner with respect to the matrix 17, between a withdrawn position with respect to the zone 31 and a position in which they project inside the mold 19, whilst nevertheless remaining spaced with respect to the zone 21 of the convex mold face 20; in this zone 31 of the concave mold face 30, the points 47 are spaced along a virtual circle 60 centred on the axis 18, situated between the sharp corner 39 of the junction with the groove 37 and the junction of the zone 31 with the zones 32 and 33, whilst being spaced two by two along the length of the circle 60 and having axes for sliding with respect to the matrix 17 locally perpendicular to the zone 31 of the face 30.

Thus, if each point 47 is considered individually, and considering a plane parallel to the axis 18 (or possibly including this axis) and including the axis 48 of this point, as is for example the case of the cross-section plane referenced IV—IV in FIG. 3, it will be noted that, in the zones of the mold 19 situated on this plane, and immediately in its proximity, on one side and the other of it, the point 47 considered delimits on the one hand between it and the injection aperture 43 a zone 61 in which a joint migration of the two fluid materials successively injected into the mold 19 can be produced in the conventional conditions of two-material injection, that is to say with a continuous skin of first injected material on both sides of second injected material, the continuous skin being at both the convex mold face 20 and the concave mold face 30, and on the other hand, between the point 47 and the zone 29 of the face 26 of the die 16, a zone 62 in which the migration of the first injected material along the length of the concave mold face 30 (and more precisely along the length of the zone 32 of it if one refers to FIG. 4, it being intended that an analogous phenomenon is produced for every point 47) cannot freely occur; the point 47 causes in the first injected material an interruption immediately filled by the second injected material which can then come into direct contact with the concave mold face 30 (zone 32 in the example illustrated in FIG. 4) in the zone 62; for operation of the method according to the invention, in this zone 62, on the mentioned plane parallel to the axis 18 (or including this) and including the axis 48 of the point 47 considered, open in the concave mold face 30 (that is to say in the zone 32 in the example illustrated in FIG. 4) several vents 63 arranged in the matrix 17.

On the contrary, the spaces 64 separating two immediately neighbouring points 47 allow the first injected material to migrate without disturbance, so that the normal conditions of two-material injection are found in these spaces 67, even in the planes parallel to the plane 18 (or including it) and passing through these spaces 64, as is the case in the cross-section plane referenced V—V; in FIG. 3.

For operating the method according to the invention, the mold described is associated with a two-material injection head 65 juxtaposed to the matrix 17 and having opposite the channel 44 on the axis 18 and in tight communication with the channel 44, on the one hand a tubular duct 66 on the axis 18 and on the other hand an annular duct 67 arranged coaxially about the duct 66; within the scope of operation of the method of the invention, one of these ducts, for example the duct 66 is intended for the injection into the mold 19 of a thermosetting core material in fluid state, and it is connected for this to feed means of such a material under pressure, such means being known to the man skilled in the art and accordingly not requiring description; the other of these ducts, that is the duct 67 in this example, is intended to ensure the injection, into the mold 19, of thermoplastic skin material in fluid state, and is connected for this to feed means of such material held at a temperature greater than its plasto-elasticity temperature; for holding the fluid state not only for the thermosetting core material but also for the thermoplastic skin material, the injection head 65 has around the duct 67 heating means 68 for example in the form of electric resistances in order to hold the thermoplastic material from the duct 67 at a temperature greater than its plasto-elasticity temperature, whereas cooling means 69 for example in the form of a circuit for circulating a cooling fluid are arranged around the duct 66 in order to hold the thermosetting material at a temperature less than its polycondensation temperature; further, between the means 69 and the duct 67 is interposed at least one thermally insulating layer designated 70; the production of such an injection head is within the scope of the normal capabilities of the man skilled in the art and the structure which has been described is in no way limitative since the imperatives connected to the maintenance of thermosetting material as well as thermoplastic material in liquid state are agreed.

The operation of the method according to the invention can be carried out in the following manner by means of such an injection head 65 and mould 15 supposedly assembled in a relative coaxial disposition as is shown in FIG. 1, the die 16 being assembled to the matrix 17 in a manner to delimit the mold 19 and the injection head 65 being assembled to the matrix 17 so that the injection channel of this latter, and with it the assembly of the mold 19, is in fluid-tight communication with the two ducts 66 and 67 of the injection head 65.

Initially, the points 47 occupy, under the action of the means 58, their position projecting inside the mold 19 as is illustrated in FIGS. 1 to 4.

Taking care to choose the thermoplastic skin material and the thermosetting core material so that the temperature of polycondensation of the second is greater than the plasto-elasticity temperature of the first, the mold 19 is brought to a temperature between these two temperatures, by circulation of an appropriate fluid in the channels 45 and 46, and this intermediate temperature is maintained in the mold 19, thanks to a control of temperature of this fluid via means known in themselves, whilst the two successive phases of injection of the thermoplastic skin material followed by the thermosetting core material which will now be described.

In a first period, thermoplastic skin material in liquid state is injected via the duct 67 which material, taking account of the temperature to which is brought the mold 19, remains fluid; the volume of thermoplastic skin material thus injected corresponds substantially to the volume of the skin to be produced in the reflector 1, that is generally in the region of ⅓ of the total volume of the reinforcement layer and of the skin layer in this reflector, that is to say equal to approximately ⅓ of the volume of the mold 19 so that the thermoplastic material thus injected remains grouped together, in the mold 19, about the injection aperture 43 and in the channel 44; preferably, the path separating each of the points 47 from the injection aperture 43 in the mold 19 is such that these points 47 remain disengaged from the thermoplastic skin material thus injected, even after injection of the entire desired volume of this material.

After this injection, the injection follows directly, via the duct 66, of the thermosetting core material of which the holding of the mold 19, and with it, the thermoplastic skin material at a temperature lower than its polycondensation temperature permits the preserving of the fluid state as well as that of the thermoplastic skin material; as this injection of thermosetting material proceeds, of which the total volume thus injected corresponds substantially to the total volume of thermosetting material provided in the reflector to be produced, and more precisely to the balance of the volume of the first injected thermoplastic material, to the total volume of the mold 19, the thermosetting material causes progressive migration of the thermoplastic material in the mold 19, in the direction of extension with respect to the injection aperture 43 and, until the thermoplastic material reaches the points 47, there occurs in the known manner the formation of a layer of thermosetting core material between two skins of thermoplastic skin material covering respectively the convex mold face 20 and the concave mold face 30.

However, once the thermoplastic skin material pushed by the thermosetting core material reaches the points 47, this known phenomenon occurs only in the intermediate spaces 64 between two neighbouring points 47, then, progressively as the migration continues, in each of the interposed spaces between two neighbouring zones 62 of the mold 19; FIG. 5 shows this phenomenon and shows a layer 72 of thermosetting core material in fluid state, migrating in the direction 71 from the injection aperture 43 towards the zone 29 of the face 26 of the die 19, pushing in front of it a volume 74 of thermoplastic skin material progressively covering the convex mold face 20 and the concave mold face 30 (and more precisely the zones 22 and 32 of these faces in the case of the cross-section illustrated in FIG. 5), on both sides of the layer 72 of thermosetting core material; this phenomenon is continued until the volume 74 of thermoplastic skin material reaches the zone 29 of the face 26 of the mold, and is then reduced to a minimum.

On the contrary, once, in the course of the joint migration of the thermosetting core material and of the thermoplastic skin material enclosing this thermosetting core material, the skin 73 of thermoplastic skin material developing contact with the concave mold face 30 meets a point 47, it is hampered in its migration in the direction 71 and is split as illustrated in FIG. 4, so that the thermosetting core material 72 can freely reach, downstream of the point 47 in the direction of the migration 71 the concave mold face 30 (and more precisely at the zone 32 of this if one considers the cross-section illustrated in FIG. 4); taking account of the fact that the pressure at which the thermosetting core material is injected is greater than the pressure which results in the thermoplastic skin material, further, taking account in addition of a judicious choice of the viscosity of the thermoplastic skin material, this cannot reconstitute a skin in contact with the concave mold face 30 downstream of each of the points 47 in the direction 71, so that there forms in contact with the concave mold face 30, in the layer of thermoplastic skin material, emergences of thermosetting core material, having the shape of ribs 75 extending from each of the points 47, respectively, as far as the zone 29 of the face 26 of the die 16, in each of the zones 62 of the mold. This phenomenon is facilitated by the aspect of the crackled surface which the concave mold face 30 advantageously has, which brakes the migration of thermoplastic skin material in contact with this face 30 and opposes a migration of the thermoplastic skin material in contact with this face after formation of a split by a point 47 downstream of this point in the direction of migration 71.

FIG. 3 illustrates an intermediary phase of this migration and shows the formation of emergences of thermosetting core material 72 in indentations of thermoplastic skin material 73 covering in addition the concave mold face 30.

Once, in the course of the injection of the thermosetting core material and its joint migration with the thermoplastic skin material, this latter reaches and passes the different points 47 which are provided for the formation of interruptions in this thermoplastic skin material, the withdrawal of the different points 47 can be caused, by action on the means 58; preferably, however, this withdrawal is not caused until practically the entire desired volume of the thermosetting core material has been injected, which permits ensuring the stability of the emergences in the form of ribs 75 of thermosetting core material; the withdrawal of each of the points 47 frees in the mold 19 a volume immediately filled in the main part by thermosetting core material and partially by the thermoplastic skin material.

When the injection of thermosetting core material is finished, as well as its joint migration with the thermoplastic skin material, heating of the mold 19 is caused to a temperature greater than the polycondensation temperature of the thermosetting core material, by causing circulation for this of a fluid taken to a suitable temperature in the channels 45 and 46 and in the meanwhile the relative fixing of the matrix 17 and of the die 16 is ensured; there then follows the polycondensation of the thermosetting core material, with the release of gas and vapour which, via the ribs 75, is led into the zone 62 towards the vents 63 which evacuate them to the outside of the mold 19.

When the polycondensation is thus carried out, cooling of the mold 19 is caused, by the circulation of a fluid taken to an appropriate temperature in the channels 45 and 46, to a temperature less than the plasto-elasticity temperature of the thermoplastic skin material, until hardening of the latter.

One thus obtains inside the mold 19 a rigid product which is then disengaged on separating the die 16 from the matrix 17.

The product thus obtained has the general form of the wall 3 of the reflector 1 before the deposit of the reflective metallisation layer 10 when the product is integrally closed, inside the annular edge 12 formed by the groove 13, by the disc of material formed between the zone 25 of the convex mold face 20 on the one hand and the face 41 as well as the injection channel 44 on the other hand; this disc is then removed for example by boring, for forming the aperture 11.

The zones 21,22,23 of the convex mold face 20 having formed respectively the face 5 and the faces such as 8 of the wall 3 whilst giving them their mirror finish, the wall 3 thus obtained has about the axis 2, corresponding to the axis 18, a concave face integrally defined by the thermoplastic skin material and having a polished surface such that one can directly deposit there a reflective metallic layer 10, for example a vacuum deposited aluminium layer, without preliminary treatment of this face.

The zones 31,32,33 of the concave mold face 30 having created respectively the face 6 and faces such as 9 of the wall 3, this also presents towards the outside a layer of thermoplastic skin material 73 but in zones corresponding to the zones 62 of the mold 19, this thermoplastic material layer 73 is substituted by localised emergences 75 of the thermosetting core material otherwise integrally covered by the thermoplastic skin material 73, these localised emergences having with respect to the rest of the layer of thermosetting core material the shape of separate ribs spaced in the thermoplastic skin material 73; the face 6 as well as the faces such as 9 of the wall 3 is crackled as a result of their forming by the concave mold face 30, but this surface aspect is of no importance since these faces have no optical role at all; the emergences 75 of thermosetting core material extend as far as the edge 28 of the wall 3.

Naturally, numerous thermoplastic materials and thermosetting materials can lend themselves to the operation of the method, provided that the condensation temperature of the thermosetting material is greater than the plastoelasticity temperature of the thermoplastic material.

By way of non-limitative example, one will advantageously choose a thermoplastic skin material having a fluidity of 30–45 g. (10 mn) following baking for 3 hours at 150° C. or one hour at 180° C., in accordance with the standards D1238 (T), whilst holding the mold 19 at a temperature of the order of 130°–180° C. on injection of this thermoplastic skin material then the injection of the thermosetting core material accompanied by the joint migration of the two materials.

For example, one will choose a thermoplastic skin material with a crystalline structure in the group comprising polyolefins (for example pentene polymethylene) polyamides (for example partially crystalline aliphatic homopolyamide, 4.6, 6.6, 6G polyamide), polyethers (for example polyoxyphenylene), polysulfures (for example sulfure polyphenylene), linear polyesters (for example terephtalate polyethylene) and their mixtures; preferably mineral microloadings will be incorporated such as titanium oxide, barium sulphate or other pigments, for example in the region of a 17% ratio, experience having shown such addition facilitates direct anchoring of the reflective metallic layer 10 on the thermoplastic skin layer 73; the thermosetting core material will be chosen for example in the group comprising unsaturated polyesters and phenolic resins, advantageously loaded with glass fibres, with or without an inflating agent; preferably, the addition of an inflating agent will be provided in a proportion of the order of approximately 5%, experience showing that such an addition causes a gain in weight, facilitating the operation and procuring a more homogeneous distribution of the loadings such as glass fibres, leading to a particular improvement of mechanical properties of the thermosetting material after polycondensation.

Naturally, numerous variants of operation of the process which has been described can be incorporated into it without departing from the scope of the present invention; particularly, the shape of the points 47 will be different from the shape described and shown, and can for example give to these points the shapes illustrated in FIGS. 10 and 11, that is to say a shape in which the conical face 50 is replaced by a plane face, respectively 76 or 77, and in which the surface 49 is replaced by a hemicylindrical surface 78 about the axis 48 facing upstream with reference to the direction of migration 71 and by a flat surface 79 facing downstream with reference to this direction (FIG. 10) or by three flat surfaces 80,81,82 joined two by two along sharp straight corners 83,84,85 parallel to the axis 48 and of which one 83 faces upstream with respect to the direction 71 whilst the surface 82 delimited by the two other sharp corners 84,85 faces downstream with reference to this direction; whatever the shape chosen for the points, the means for withdrawing or projecting these points inside the mold 19 can also be provided in a different manner from that which has been described and shown.

We claim:

1. In a method of producing a reflector for a headlight, particularly for an automobile, comprising the manufacture of a wall having a core layer, of predetermined volume, intended to give said reflector its characteristics of mechanical strength and a skin layer of predetermined volume, at least partially enclosing said core layer on both sides, whilst defining a smooth concave face intended to form a reflective face of said reflector, by the succession of stages consisting in:

(a) delimiting a mold for said wall, of a volume substantially corresponding to the sum of said predetermined volumes, by means of a convex mold face having a shape complementary to that of said concave face and of a concave mold face placed opposite said convex mold face and spaced from this latter, whilst arranging an injection aperture opening into said mold, (b) injecting into said mold, via said injection aperture a volume of thermoplastic skin material corresponding substantially to said predetermined volume of the skin layer, said thermoplastic material having a predetermined plasto-elasticity temperature and being injected at a temperature greater than this plasto-elasticity temperature, (c) injecting into said mold and into said thermoplastic skin material, via said injection aperture a volume of core material in a fluid state corresponding substantially to said predetermined volume of said core layer, whilst maintaining said thermoplastic skin material at a temperature greater than its plasto-elasticity temperature so that said core material in fluid state causes said thermoplastic skin material to progressively migrate against said convex and concave mould surfaces, in the direction of extension with respect to said injection aperture and that said thermoplastic skin material is sandwiched in the mold between on the one hand said core material and on the other hand said convex and concave mold faces, (d) permitting or causing a hardening of said thermoplastic skin material, at least, to obtain a rigid wall inside said mold, (e) disengaging from said mold said rigid wall thus obtained, the improvement comprising:

during stage a, placing, projecting with respect to said concave mold face, inside said mold, a plurality of points spaced with respect to said injection aperture, mutually spaced and opposite said convex mold face, for preventing the migration of said thermoplastic skin material during stage c, against localised zones of said concave mold face, situated opposite from said injection aperture with respect to said different points, respectively, and then permitting access of said core material to said localised zones of said concave mold face, during stage c, injecting by way of core material a thermosetting material having a polycondensation temperature greater than the plasto-elasticity temperature of said thermoplastic skin material, whilst maintaining said mold at a temperature intermediate between said temperatures respectively of polycondensation and of plasto-elasticity and withdrawing said points with respect to said concave mold face at an intermediate stage of said injection of said thermosetting core material, preliminarily to stage d, arranging vents opening into said mold through said localised zones of said concave mold face, during stage d, causing heating of said mold to a temperature greater than said polycondensation temperature of said thermosetting core material then permitting or causing a cooling of said mold to a temperature lower than said plasto-elasticity temperature of said thermoplastic skin material.

2. A method according to claim 1, wherein said convex mold face is chosen or made to have a mirror finish, and a reflective metallic layer is applied directly onto said concave face of said skin layer, after stage e.

3. A method according to claim 2, wherein said thermoplastic skin material contains mineral micro-loadings.

4. A method according to claim 1, wherein said thermoplastic skin material has a fluidity of 30 to 45 grammes (10 minutes) following a baking either of three hours at 150° C. or of one hour at 180° C., following the standards ASTM D1238 (T), and said mold is maintained at a temperature of the order of 130° C. to 180° C. during stages b and c.

5. A method according to claim 4, wherein said thermoplastic skin material is selected from the group consisting of polyolefins (for example pentene polymethylene), polyamides (for example partially crystalline aliphatic homopolyamide, 4.6, 6.6, 6G polyamide), polyethers (for example polyoxyphenylene), polysulfures (for example sulfure polyphenylene), linear polyesters (for example terephtalate polyethylene) and their mixtures.

6. A method according to claim 1, wherein said volume of thermoplastic skin material is of the order of ⅓ of the volume of said mold.

7. A method according to claim 1, wherein said concave mold face is chosen or made crackled.

8. A method according to claim 1, wherein said thermosetting core material is loaded.

9. A method according to claim 8, wherein said thermosetting core material is loaded with glass fibres.

10. A method according to claim 1, wherein said thermosetting core material is selected from the group consisting of unsaturated polyesters and phenolic resins with or without an inflating agent.

11. A method according to claim 1, wherein said points are withdrawn during the final stage of injection of said thermosetting core material.

* * * * *